July 22, 1924.
U. BLUM
1,502,230
PERISCOPE
Filed Aug. 29, 1921
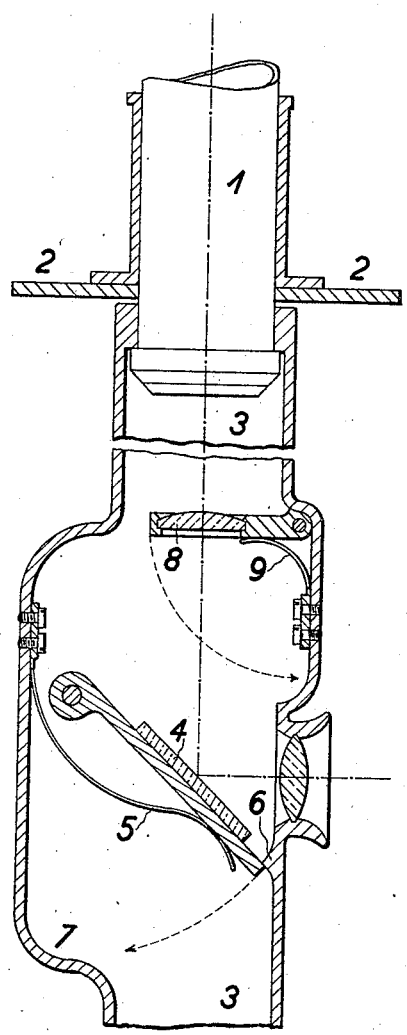

Patented July 22, 1924.

1,502,230

UNITED STATES PATENT OFFICE.

ULRICH BLUM, OF KIEL, GERMANY.

PERISCOPE.

Application filed August 29, 1921. Serial No. 496,735.

(GRANTED UNDER THE PROVISIONS OF THE ACT OF MARCH 3, 1921, 41 STAT. L., 1313.)

*To all whom it may concern:*

Be it known that I, ULRICH BLUM, a citizen of the German Empire, residing at Kiel, Germany, have invented a new and useful Periscope (for which I have filed an application in Germany, March 14, 1919; England, July 7, 1920, Patent No. 147,083; Italy, July 8, 1920; Japan, August 3, 1920; and France, October 9, 1920, Patent No. 519,983), of which the following is a specification.

The invention relates to a periscope the ocular of which does not move in or out with the sliding tube. In periscopes of the said kind which have hitherto become known the rays of light are at the bottom end of the sliding tube deflected by two prisms through 180° to enable them to emerge from the sliding tube in an upward direction and to enter the ocular deflecting them through about 90°. In consequence the brightness which the said periscopes yield is reduced as compared with the usual rigid periscopes, when similar optical conditions are prevailing, on account of the light having to pass through two additional large prisms on its way to the ocular. Besides, this construction necessitates a somewhat higher position of the observer, if by a given length of the sliding tube the same height of look-out opening as in the case of rigid periscopes is to be attainable. Furthermore, in the case of a submarine periscope the bottom part of the sliding tube, which contains the two additional prisms referred to, can only be fitted to the said tube after the latter has been introduced into the stuffing-box of the boat, in which manner the sliding tube cannot be inserted in a state which permits of its immediate optical use.

In accordance with the invention the disadvantages referred to are obviated by constructing, on the one hand, the sliding tube so as to let the rays of light emerge from it in a downward direction, and, on the other hand, the stationary part containing the ocular in such a manner as to permit of the descending tube to be passed through it. By constructing the periscope in the said manner the two additional prisms are eliminated; besides, (since the bottom end of the sliding tube may be raised considerably above the ocular) the new periscope permits of having the observer placed in a lower position as compared with the known periscopes of the said kind, or the usual rigid periscope (e. g. in the interior of a submarine to enable him to supervise at the same time what happens inside the boat), also, the sliding tube may be moved out, and lowered respectively, as far as this is possible in the known periscopes of the said kind, or in rigid periscopes. Furthermore, in the new periscope the sliding tube possesses no projecting optical parts which might be in the way when lifting the tube out of a stuffing box, or introducing it into the same.

The optical members of the stationary ocular part which are situated in the path which the sliding tube takes when being introduced may be moved out of the path to leave a clear road for the descending tube, either automatically by the tube itself, or in any other suitable manner (e. g. by means of the hoisting device of the tube). In an appropriate manner, when the sliding tube ascends, the said parts are brought back into their original position by a spring, or in any other suitable manner (e. g. hydraulically or with the aid of compressed air). To avoid moving the said disturbing optical parts along with the sliding tube down to its lowermost position, provision is suitably made that the said parts fold into recesses in the stationary part containing the ocular when the tube is being drawn in.

The annexed drawing shows a constructional example of the invention in section.

1 denotes the sliding tube lifted out of a ship's body 2 in full height, 3 the stationary part containing the ocular. The only ocular mirror 4 becomes pressed by means of a spring 5 against a stop 6. The tube 1, on descending, pushes the mirror 4 into a recess 7. The field-lens 8 of the ocular may also be folded in; a spring 9 tends to keep it in the position required when observing.

I claim:

1. In a periscope a stationary part, containing an ocular, a sliding tube containing optical elements and admitting of the rays of light emerging in a downward direction, the sliding tube being movable in the direction of its axis, the stationary part being adapted to allow the sliding tube on descending to pass through the stationary part, and the sliding tube being adapted to remove the optical parts situated within the stationary part in the path of the sliding tube out of the operative position of them.

2. In a periscope a stationary part containing an ocular, a sliding tube containing optical elements and admitting of the rays of light emerging in a downward direction, the sliding tube being movable in the direction of its axis and the stationary part being adapted to allow the sliding tube on descending to pass through the stationary part, the optical parts situated within the said stationary part in the path of the sliding tube, being movable out of this path, and means for restoring their original position required during observation, on the said sliding tube ascending again.

3. In a periscope a stationary part containing an ocular, a sliding tube containing optical elements and admitting of the rays of light emerging in a downward direction, the sliding tube being movable in the direction of its axis and the stationary part being adapted to allow the sliding tube on descending to pass through the stationary part, the latter containing recesses for receiving the optical parts situated within the said stationary part in the path of the sliding tube on the sliding tube descending.

ULRICH BLUM.

Witnesses:
FRITZ SANDER,
RICHARD HAHN.